United States Patent [19]

Wadsworth

[11] Patent Number: 4,621,010
[45] Date of Patent: Nov. 4, 1986

[54] CORROSION RESISTANT STRUCTURES AND ELEMENTS AND METHOD OF MAKING SAME

[75] Inventor: Herman C. Wadsworth, Truro, England

[73] Assignee: Noncor Linings N.V., Curacao, Netherlands Antilles

[21] Appl. No.: 638,411

[22] Filed: Aug. 7, 1984

[51] Int. Cl.⁴ ............................................. B05D 7/00
[52] U.S. Cl. .................... 428/220; 264/269; 264/331.11; 428/331
[58] Field of Search ............... 428/220, 331; 523/220; 264/269, 331.11, 348

[56] References Cited

U.S. PATENT DOCUMENTS

| | | | |
|---|---|---|---|
| 2,751,775 | 6/1956 | Sergovic | 428/331 |
| 3,328,231 | 6/1967 | Sergovic | 428/331 |
| 3,562,076 | 2/1971 | Lea | 428/331 |
| 3,575,785 | 4/1971 | McManimie et al. | 428/331 |
| 3,632,725 | 1/1972 | Jones | 428/331 |
| 4,205,028 | 5/1980 | Brueggemann et al. | 264/269 |
| 4,251,586 | 2/1981 | Marzocchi et al. | 428/220 |

Primary Examiner—Lewis T. Jacobs
Attorney, Agent, or Firm—Larson and Taylor

[57] ABSTRACT

A composite material suitable for use in making containers or structures exposed to corrosive chemical attack is achieved by mixing a synthetic plastics resin material with two different hardeners and employing a filler of particulate siliceous material which may be sand, gravel, quartz stones or the like. Structures made from the material are both structurally self supporting and resistant throughout the body thickness to corrosive chemical attack. A skim coat of the same resin with a filler of fine particles, less than 0.5 mm, can be employed, in which case the body can incorporate larger particles, such as 6 mm and above.

The synthetic resins employed may be selected from the group comprising vinyl ester, polyester, bisphenol, epoxy and isophthalic resins.

12 Claims, 5 Drawing Figures

CORROSION RESISTANT STRUCTURES AND ELEMENTS AND METHOD OF MAKING SAME

BACKGROUND OF THE INVENTION

The present invention relates to corrosion resistant structures and elements, and particularly to a corrosion resistant container suitable for use as an acid resistant electrolytic cell for use in the production, refining and plating of non-ferrous metals.

The present invention is thus particularly, although not exclusively, applicable to the field of electrolytic recovery of metals for which corrosive metal-bearing acid solutions are employed.

Many metals are produced or recovered by the use of electrolysis either from a waste solution or by refining contaminated metal anodes. The production of metals by electrolysis is usually effected in container or "cells" housing a plurality of rows of electrodes (alternately anodes and cathodes). These are immersed, or at least partly immersed in electrolyte and an electric current is passed between adjacent pairs or sets of anodes and cathodes, through the electrolyte, to cause electrolytic deposition of the metal from the electrolyte onto the anode, whilst the cathode is consumed by the ion exchange.

The electrolyte is almost invariably an acid solution of a type which is highly corrosive to the material of the container or cell. In order to resist this corrosion and give the container or cells an extended useful life many attempts have been made in the past to provide the cell walls and floor with a suitable acid resistant coating which is also able to withstand the mechanical abrasion and knocks incurred whilst loading and unloading cells with fresh and spent electrodes respectively, both of which operations have to be performed at regular intervals during use of the cell. Previous attempts to resist the corrosion have, however, been of only limited success so that regular, in some cases frequent, replacement has been necessary. The majority of known protective systems for the cell employ a number of coatings and linings over a base material which is usually a conventional concrete, each layer providing a particular protection. Such cells have required regular maintenance and periodic replacement however, and even in the best cases the coatings have only extended the life of the cell by a relatively short time period of from one to five years, after which the whole structure has to be replaced due to degradation in the base concrete as a result of acid attack. In view of the high cost of metal processing cells such a state of affairs in far from satisfactory.

OBJECTS OF THE INVENTION

The primary object of the invention is to provide a corrosion resistant structure such as an electrolytic cell which can be manufactured at a reasonable cost whilst offering a very extended life without requiring any maintenance.

Another object of the invention is to provide a material which will be corrosion resistant throughout its body rather than merely having corrosion resistant layers.

SUMMARY OF THE INVENTION

According to one aspect of the present invention, therefore, a composite material for use n casting containers or structures exposed to corrosive chemical attack, particularly attack by corrosive acids, comprises a synthetic plastic resin with an inert particulate filler composed of not less than 70 per cent by weight of rounded particles in a size range not less than 0.5 mm, with the overall ratio by weight of particulate filler material to resin being in the region of 8:1.

The material used as the filler is preferably a bulk siliceous aggregate or other siliceous particulate material, and such material will usually be available locally to any particular site. For example, the filler of particulate material may be composed of or include stone or quartz particles and/or coarse sand. It is important that the particulate material should be composed of particles the majority of which are rounded, rather than being freshly crushed in which case the particles have a shape with sharp corners. It is believed that sharp corners are more susceptible to acid attack whereas the smooth surfaces of rounded particles are more resistant because they present no singularities at which the corrosion process can commence.

In a typical structure made in accordance with the invention a fraction in the region of 40 per cent by weight of the total filler of particulate material is preferably in a size range from 0.5 mm to 1 mm, and other fractions include a fraction in the region of 15 per cent by weight in a size range between 1 mm and 1.75 mm whilst a further fraction in the region of 15 per cent by weight of the total filler lies in a size range between 1.75 mm and 3 mm. A fraction up to 6 mm may also be used and it has been found that such larger particles impart great strength to the finished structures. The biggest particles incorporated in the material would depend on the overall dimensions of the structure for which the material is intended. The bigger the structure the larger the biggest fraction requires to be. For small sections it may be sufficient only to use the smaller end of the size range. Particularly for the application outlined above, where the material is employed in the manufacture of electrolytic cells, the smaller cell units may have dimensions of 600 mm wide by 600 mm high by 1,500 mm long whilst larger units may be 1,500 mm wide and up to 6,500 mm long. Even larger cells may be made using the materials and techniques of the present invention, however, and these may be structurally reinforced by a skeleton of steel or may be totally unreinforced depending on the particular design criteria. Very large containers may be cast monolithically or may be made in sections for subsequent connection upon installation.

The present invention also comprehends a structure such as a container or cell when made by the method described herein from the material defined hereinabove. In particular the invention includes a structure such as a container wall having a base material as defined above with an integrally formed outer skin of the same synthetic plastics material as the main body of the structure and a fine particulate material filler of siliceous material, in particular quartz sand. The outer skin may be in the region of 3 mm to 5 mm thick and may be formed using any of the techniques which will be described below.

The synthetic plastics resin employed in the material of the present invention may be one selected from the group comprising vinyl ester, polyester, bisphenol, epoxy and isophthalic resins. During the preparation of the material the synthetic plastics resin is preferably cured by the addition of two curing accelerators or hardeners and at least one catalyst. The two curing accelerators preferred at present are dimethyl analine and cobalt octoate, whilst the preferred catalyst is methyl ethyl ketone peroxide.

The present invention also comprehends a method of producing a structure such as a container resistant both to mechanical stresses and to chemical attack, in particular attack by corrosive acids, comprising the steps of: introducing a bonding synthetic resin into a rotary drum, adding a hardening accelerator or other curing promoter, introducing into the drum a particulate material composed of not less than 70 per cent by weight of rounded particles in a size range not less than 0.5 mm, with the overall ratio by weight of particulate filler material to resin being in the region of 8:1, rotating the drum about an upright, substantially vertical axis with a fixed flow distributor or paddle projecting into the drum for a predetermined period, adding a catalyst to the drum and further rotating the drum to mix the catalyst thoroughly into the mixture in the drum, and casting the material in a mould. The casting step is preferably performed by turning the mixture out of the drum into a mould, perhaps utilising transport means for transferring the mixture from a mixing station to a casting station, and vibrating the mixture in the mould such as by striking the surface to exclude air bubbles. In structures of any substantial size, cooling of the mould during the curing, which is an exothermic process, is also required. Such cooling can be effected by directing a flow of air over the mould containing the curing resin, and containing the air flow within baffles or shrouds. Once the resin has cured sufficiently to retain its shape without the mould, this latter is stripped away, preferalby in sections, and cooling is continued by passing cooling air over the moulded article, again baffles and/or shrouds being erected around the article to guide and/or deflect the air flow over and around the moulded article during cooling.

The outer skin with the finer particulate filler may be applied after casting, such as by skim coating the material with a trowel or a float, or may be preliminarily introduced into the mould and applied to the mould walls, again for example by trowelling immediately prior to introduction of the material which is to form the main body of the structure so that cross linking and firm bonding across the interface take place upon curing of the resin whereby the skin and main body become effectively a uniform structure.

The invention will be better understood from a study of the following detailed description with reference to the accompanying drawings, given purely by way of non-limitative example.

DESCRIPTION OF THE PREFERRED EMBODIMENTS

Figure 1:
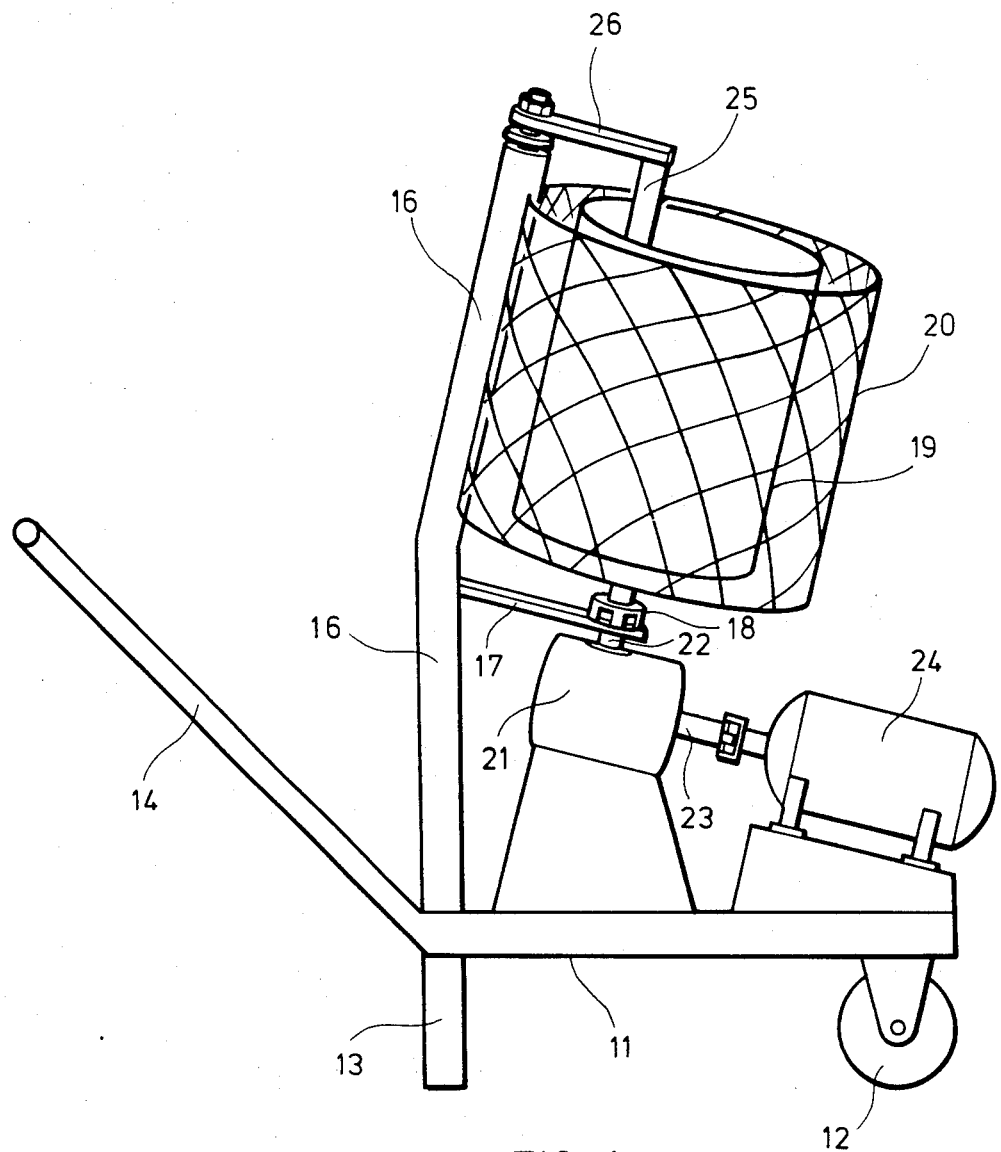
FIG. 1 is a side view of apparatus for preparing a material in accordance with the principles of the present invention.
Figure 2:
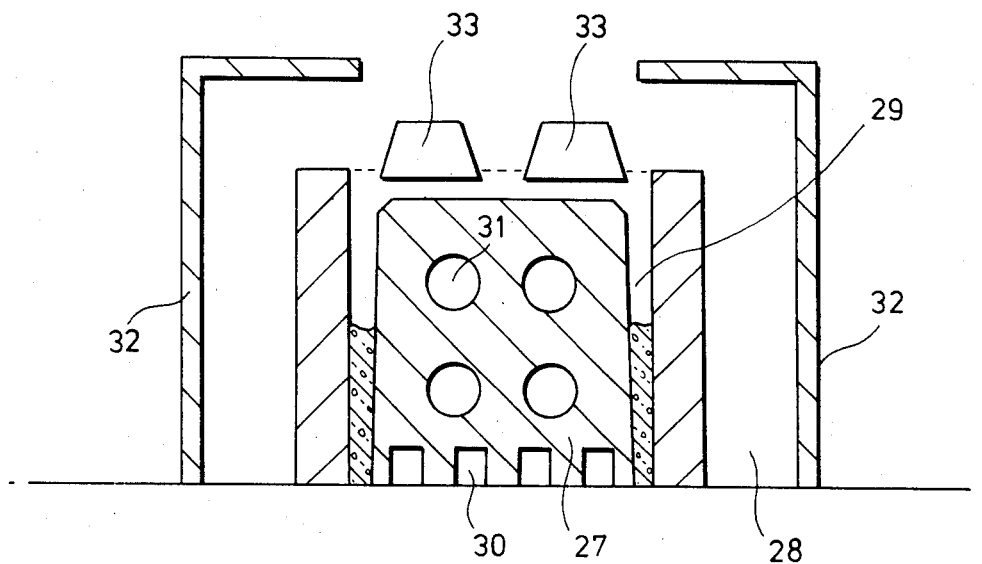
FIG. 2 is a sectional view of a mould in which a structure constituting a first embodiment of the invention is being formed.
Figure 3:
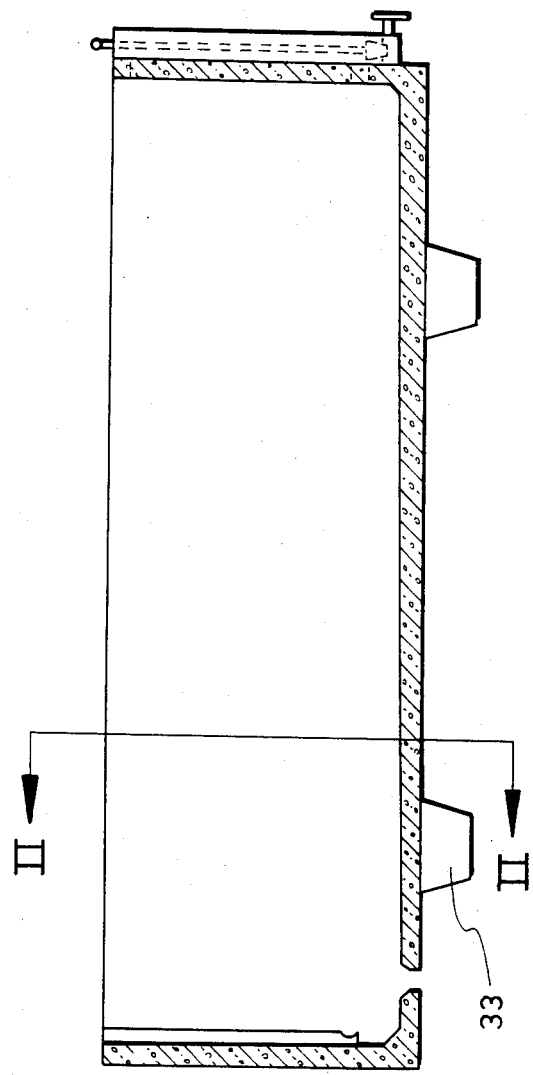
FIG. 3 is a sectional side view of a container made in accordance with the principles of the present invention.

Referring now to FIGS. 1 to 3 of the drawings, the equipment illustrated in FIG. 1 is a readily transportable mixer comprising a base frame 11 having wheels 12 at one end and a support leg 13 at the other. A suitable handle 14 projects from the frame to allow the apparatus to be moved from place to place on the wheels 12. A strut 15 projects upwardly from the base and has a cranked arm 16 inclined at an angle of about 12½° to the vertical. From this arm projects a support 17 for a rotary bearing 18 to which a drum 19 can be fitted for rotation therewith. Around the drum 19 extends a cylindrical cage 20 which is fixed to the arm or strut 16 and provides protection for the operator. A reduction gearbox 21 is connected to the bearing 18 by its output shaft 22, the input shaft 23 being connected to a drive motor 24 mounted on the frame 11 of the apparatus.

A paddle 25 projects into the drum 19 from a support arm 26 which is removably mountable on the strut 16 to permit ready replacement and removal of the drum 19.

In use of the apparatus a measured quantity of a resin such as a polyester resin is introduced into a drum 19 whilst this is rotating about its axis at approximately 12½° to the vertical. Styrene may be added to adjust the viscosity of the resin in dependence upon the ambient temperature, and subsequently two curing accelerators, namely dimethyl analine and cobalt octoate are added and mixed for approximately 30 seconds to obtain a thorough mixing of the ingredients. Subsequently a graded filler of particulate siliceous material, such as quartz sand and gravel is introduced into the drum. The dimensions of the filler will depend as mentioned above on the intended size of the casting, but for a wall having a section in the region of 75 to 100 mm the proportions set out above have been found to be satisfactory that is 30 per cent by weight in the range 0 to 0.5 mm, 40 per cent by weight in the range 0.5 to 1 mm, 15% by weight in each of the ranges 1 mm to 1.7 mm and 1.75 mm to 3 mm. This filler must be substantially dry, that is containing a maximum water content of no more than 2%. The ratio of filler to resin is preferably in the region of 8 to 1 and having introduced the filler mixing then continues for a further 30 seconds to ensure that all the surfaces are wetted before the catalyst is added. A conventional catalyst, such as methyl ethyl ketone peroxide, in a proportion of 1.8% by weight of resin may be employed. Once mixing has been thoroughly completed, the drum 19 is removed and taken to the casting site whilst a fresh drum 19 is fitted to the machine and further mixing continues. The paddle 25 acts to keep the side walls of the drum clear and to ensure that the mixing progresses as rapidly and effectively as possible.

A container such as that illustrated in FIG. 3 is made inverted over a mandrel 27 as shown in FIG. 2. The mandrel 27 defines the interior surface of the container and is surrounded by a wall 28 defining the outer surface of the container and forming with the mandrel 27 an interspace 29 into which the material is cast. The mandrel 27 has a plurality of cooling slots 30 in the lower face and passages 31 within its interior to assist the cooling. As successive batches of material arrive at the mould from the mixer, they are introduced into the wall space 29 and pressed down into intimate contact with the material already present. A vibrator (not shown) pressing or patting on the surface of the material helps to compact the filler an exclude air bubbles. Once the material has reached the level of the top of the mandrel 27 and, that is to say, the base of the container is being cast, the necessary feet 33 can be added and cast in situ. When the required material thickness for the floor has been achieved the material is smoothed off and left to harden.

Cooling air is directed over the mould and guided by baffles 32 on either side which help to reduce the temperature of the material whilst it is curing. After sufficient curing has taken place for the material to have achieved an inital "set" and be self supporting the mould is stripped away and cooling continues until the reaction has passed its inital vigour and the temperature rise without cooling is not excessive. Because the material is introduced into the mould in a paste like consistency it cannot be poured but rather is "spooned" into the mould and compaction is achieved by ramming it by means of an impact pneumatic rammer which serves, as mentioned above, to squeeze out the air bubbles.

Figure 4:
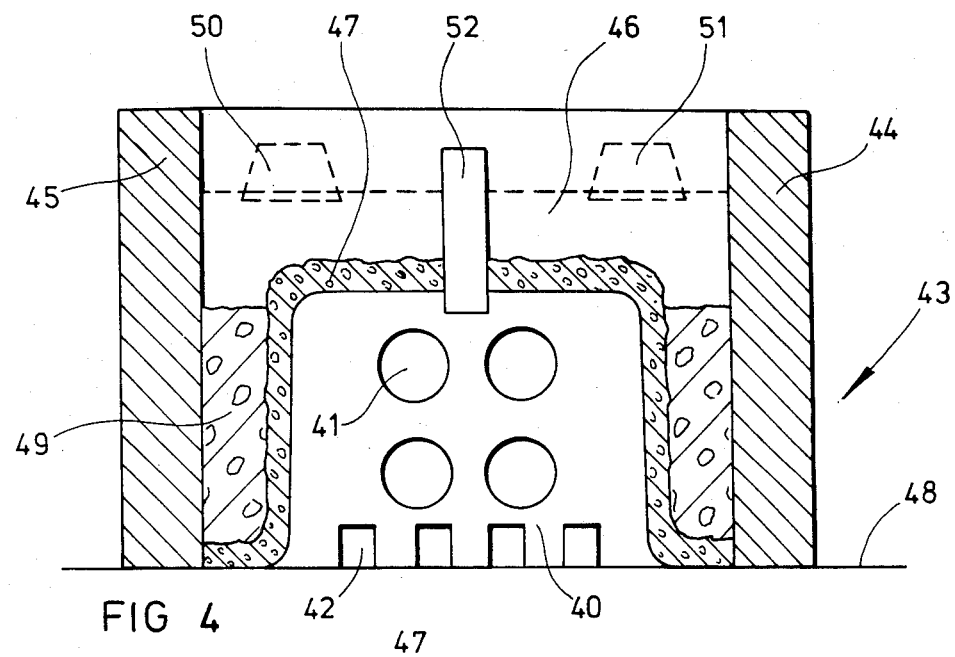
FIG. 4 is a sectional view, similar to FIG. 2, illustrating an alternative process for forming a container.

Refering now to FIG. 4, one step in the production of corrosion resistance for containers in use as electrolytic cells is illustrated. In FIG. 4 there is shown a central core 40 which defines the interior shape of the cell, and which has a plurality of central passages 41 and peripheral grooves 42 allowing coolant air or other fluid to be circulated therethrough.

The central core 40 is located within a mould generally indicated 43 having upright side walls 44, 45 and an end wall 46. These walls are fitted together in a manner which enables them to be dismantled, but which is not illustrated in detail in the drawing, and the internal surfaces of these walls is provided with a finish corresponding to the surface finish desired on the outside of the finished container or cast. In the process illustrated in FIG. 4 the base material for the cast container includes a proportion of large particles, that is, large quartz particles of 6 mm or above, present in a proportion of up to 20 per cent of the overall filler. Such a material may exhibit a slight porosity although it has great structural strength and enables containers to be produced more economically than in the embodiment illustrated in FIGS. 2 and 3 by providing a saving in resin due to the greater volume of the filler. For this reason a coating of denser and finer material is provided on those surfaces of the container which will come into contact with the acid during use. This is achieved by forming a fine mix of resin and fine particles, that is, particles in the region of 0.1 mm to 0.5 mm mixed at a ratio of four parts of the filler to one part resin. This mix is then applied by trowel in a thin layer 47 over the mandrel 40 and the lower surface 48 of the mould 43 and, before it has cured, the main body of the composite material is cast into the mould as illustrated by the volume 49 of composite material which is illustrated as half filling the mould. This material is cast into the mould in the same way as described above in relation to the embodiment of FIGS. 2 and 3, until the mould is completely filled and then support feet 50 illustrated in broken outline in FIG. 4, are introduced and moulded to the surface of the casting, which will be the underside of the container when completed. As can be seen in FIG. 4, a drainage opening in the container is provided by means of a plug 52 which is secured to the mandrel 40 and projects upwardly into the casting volume of the mould to a level above the upper surface of the casting when complete.

As in the previously described embodiment, the heat generated by the exothermic reaction on curing of the resin is dissipated by passing cooling air through the passages 41, 42 and around the mould, suitably guided by shrouds (not shown in FIG. 4) similar to those of FIG. 2.

Figure 5:
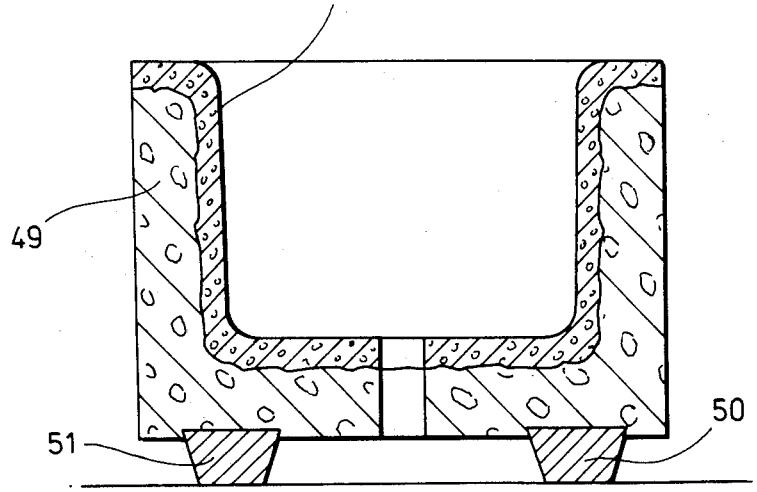
FIG. 5 is a section through a finished container made by the process illustrated in FIG. 4.

FIG. 5 illustrates the finished container when the resin has cured, the mould parts have been removed and the container inverted to its position of use. As can be seen the fine layer 47 has a smooth and continuous surface over the whole of the interior of the container, with a surface finish determined by the quality of the surface finish of the mandrel, which is preferably extemely smooth in order to ensure that the layer 47 is very closely packed and dense at the surface to provide the greatest resistance against corrosion. The interface between the fine skin layer 47 and the main body 49 is irregular due to the trowel application to the mould, but this irregularity assists in increasing the strength of the bond between the skin layer 47 and the main body 49. This layer 47 is integrally bonded to the main body 49 of the container of which it forms, in effect, a denser surface skin which is otherwise integral with the body. This is achieved because the resin used in forming the skin 47 is the same as the resin used in forming the main body 49 and the casting of the main body 49 takes place over the skin layer 47 before this latter has cured so that the resin across the boundary of the layers 49, 47 cross links and cures to form a unitary body of resin in the same way as it cures across the boundary between successively applied charges of resin as the container is cast utilising several batches or mixes from the drum illustrated in FIG. 1.

Alternatively, instead of applying the skin layer 47 prior to casting, this may be applied after casting, again by means of a trowel or float, and preferably after the initial set of the resin has occured but before curing is complete so that the skin layer and the body are integrally bonded to form a unitary structure.

What is claimed is:

1. The method of producing a structure resistant both to mechanical stresses and to chemical attack, in particular attack by corrosive acids, including the steps of:
   introducing a bonding synthetic resin into a rotary drum;
   adding a hardening accelerator or other curing promoter;
   introducing into the drum a particulate material composed of not less than 70 per cent by weight of rounded particles in a size range not less than 0.5 mm, with the overall ratio by weight of particulate filler material to resin being in the region of 8:1;
   rotating the drum about an upright, substantially vertical axis with a fixed flow distributor or paddle projecting into the drum for a predetermined period;
   adding a catalyst to the drum and further rotating the drum to mix the catalyst thoroughly into the mixture in the drum; and
   casting the mixture in a mould.

2. The method of claim 1, further comprising the steps of
   preparing a second mixture comprising the same synthetic resin with a filler of fine particles in a size range not greater than 0.5 mm, and
   applying said second mixture as a skin layer to the body of the structure.

3. The method of claim 2, wherein said skin layer is applied to said mould surfaces prior to casting the main body of said structure.

4. The method of claim 2, wherein said skin layer is applied to the surface of said structure after it has been removed from said mould.

5. The method of claim 1, wherein cooling of said mould is effected during curing, said mould is removed as soon as the resin has cured sufficiently to retain its shape, and cooling is continued by passing cooling air over said moulded article after removal of the mould.

6. The method of claim 5, wherein shrouds and/or baffles are erected to guide and/or deflect the air flow over and around the moulded article during cooling.

7. The method of claim 3, wherein styrene is added to said mixing drum to adjust the viscosity of said resin of either said mixture or said second mixture in dependence upon the ambient temperature prior to the addition of said curing accelerators.

8. A structure of corrosion resistant material having a body of synthetic plastics resin with an inert filler composed of not less than 70 per cent by weight of rounded particles in a size range not less than 0.5 mm and a skin layer, at least on one of the surfaces of said structure, comprising the same synthetic plastics resin as the body with a filler of siliceous particles in a size range less than 0.5 mm.

9. The structure of claim 8, wherein the thickness of said skin layer is between 3 mm and 5 mm.

10. The structure of claim 8, wherein said filler material of said skin layer comprises particles in a size range of 0.1 mm of 0.5 mm.

11. The structure of claim 8, wherein the ratio of filler material to resin in said skin layer is in the region of 4:1.

12. A corrosion resistant container formed as an electrolytic cell and made by the method of claim 1.

* * * * *